United States Patent [19]

Gannis et al.

[11] Patent Number: 4,822,625

[45] Date of Patent: * Apr. 18, 1989

[54] PROCESS FOR HONEY-ROASTING NUTS

[75] Inventors: Peter M. Gannis, Stamford; Howard Wilkins, Brookfield, both of Conn.; Oris E. Holloway, Jr., Sparta, N.J.

[73] Assignee: Nabisco Brands, Inc., Parsippany, N.J.

[*] Notice: The portion of the term of this patent subsequent to Sep. 8, 2004 has been disclaimed.

[21] Appl. No.: 27,426

[22] Filed: Mar. 18, 1987

Related U.S. Application Data

[63] Continuation of Ser. No. 797,914, Nov. 14, 1986, Pat. No. 4,692,342.

[51] Int. Cl.$^4$ ............................................... A23L 1/36
[52] U.S. Cl. ..................................... 426/93; 426/293
[58] Field of Search ............... 426/296, 293, 291, 309, 426/93, 632, 305, 629, 639, 303, 304, 307, 438, 89, 94, 103, 138

[56] References Cited

U.S. PATENT DOCUMENTS

| | | | |
|---|---|---|---|
| 4,501,758 | 2/1985 | Morris | 426/293 |
| 4,515,820 | 5/1985 | Tang | 426/309 |
| 4,522,833 | 6/1985 | Sharma | 426/305 |
| 4,647,463 | 3/1987 | Hoover | 426/291 |

Primary Examiner—Donald E. Czaja
Assistant Examiner—Carolyn Paden
Attorney, Agent, or Firm—Richard Kornutik

[57] ABSTRACT

Roasted nuts (peanuts, cashews, etc.) having desirable eye appeal, excellent taste and good storage stability are prepared by applying a predusting of a minor amount of an adhesive, film-forming material; coating raw nuts with an adhesive solution comprising an adhesive, film-forming material, honey and water; enrobing the adhesive coated nuts with a dry mixture of honey, sugar and salt; and subjecting the coated nuts to roasting, preferably air roasting. A method of operating the process on a continuous basis is also described.

1 Claim, 1 Drawing Sheet

PROCESS FOR HONEY-ROASTING NUTS

This is a continuation of application Ser. No. 797,914 filed on Nov. 14, 1985, now U.S. Pat. No. 4,692,342.

BACKGROUND OF THE INVENTION

This invention relates to a process for preparing honey-roasted, coated nuts and is more particularly concerned with a process for preparing honey-roasted, preferably by contact with hot air, nuts and with the nuts so prepared.

A variety of foods, including nuts such as peanuts and cashews, and meats such as chicken and ham have been roasted, fired or cooked after coating with a honey-containing solution. Because the honey is in direct contact with the food, it serves to transfer heat from the heat source to the food (i.e., it is the heat transfer agent). Accordingly, these products are variously referred to as honey-fried, honey-baked, or honey-roasted. The present invention provides improvements in honey roasting nuts.

U.S. Pat. No. 4,161,545 to Green et al describes the preparation of honey-roasted nuts by coating raw nuts with a mixture of water and 50 to 80% honey, enrobing the coated nuts with a dry mixture containing about 84-92% by weight of sugar and about 8-16% by weight of starch, the particle size in the mixture being in the range of 0.002 inch to 0.02 inch, and then roasting the coated nuts using either oil or air (dry) roasting equipment. It is stated that, in contrast to the use of adhesive solutions containing dextrose or corn syrup (which are said to give a dark brown color to the roasted nut) and coating solutions containing sucrose and dextrose (which are said to give a light colored roasted nut), the use of the honey-water coating solution gives a more appealing honey color and pleasant taste to the roasted nut.

More recently, U.S. Pat. No. 4,501,758 to Morris has claimed that honey in liquid form is disadvantageous for use in coating nuts. To achieve a uniform coating which has a noticeable honey flavor and yet is suitably adhesive, Morris teaches a two-stage coating procedure which employs no honey in the first stage and honey in dry form in the second stage. Unfortunately, the use of dry honey has several disadvantages versus liquid honey, including its relatively high cost, its somewhat diminished concentration of some flavor notes, and its reduced adhesive power.

Yet more recently, U.S. Pat. No. 4,515,820 to Tang describes the preparation of honey-roasted nuts with a glazed surface appearance. The single stage coating process calls for coating nuts with an aqueous solution comprising 10-20% honey and 50-70% sucrose, and then drying and roasting. And, in U.S. Pat. No. 4,522,833, Sharma states that where honey coatings are applied prior to roasting, difficulties are encountered both with coating properties and product flavor. To correct for this, Sharma discloses applying a coating slurry after partial roasting, the coating containing only a low level of honey and requiring the presence of an oil to achieve desired flow properties.

We have now found that honey-roasted nuts having excellent eye appeal, taste and texture can be prepared by a process which utilizes honey as a part of both wet and dry coating compositions applied in a process which differs significantly from those previously employed in the art and overcomes color, flavor and adhesiveness problems noted there.

SUMMARY OF THE INVENTION

It is an object of this invention to provide honey-roasted nuts having desirable eye appeal, texture and honey flavor.

It is a further object of this invention to provide honey-roasted nuts having a honey-flavored coating comprising a mixture of sweetening agents.

It is yet another object of this invention to provide a continuous process for the preparation of honey-roasted nuts having desirable eye appeal, texture and honey flavor, which avoids nut to nut sticking.

These objects, and other objects and advantages which will become apparent from the description which follows, are accomplished by the practice of this invention. In one aspect, the invention comprises a process for the provision of honey-roasted nuts including the steps of first coating raw nuts with minor amounts of a dry adhesive film forming material and then with an aqueous mixture comprising honey and an adhesive film-forming material, thereafter applying a dry flavor-coating mixture of honey, sugar and salt, and subjecting the coated raw nuts to roasting. It is an advantage that, when the honey-containing coating is applied in accordance with the present invention, the final product characteristics and efficiency of processing are especially improved when roasting is done with hot air.

In a particular and preferred embodiment, the above process of the invention is conducted on a continuous basis.

DESCRIPTION OF THE DRAWING

The invention will be better understood and its advantages will become more apparent from the following detailed description, especially when read in light of the attached drawing, wherein.

DETAILED DESCRIPTION OF THE INVENTION

Figure 1:
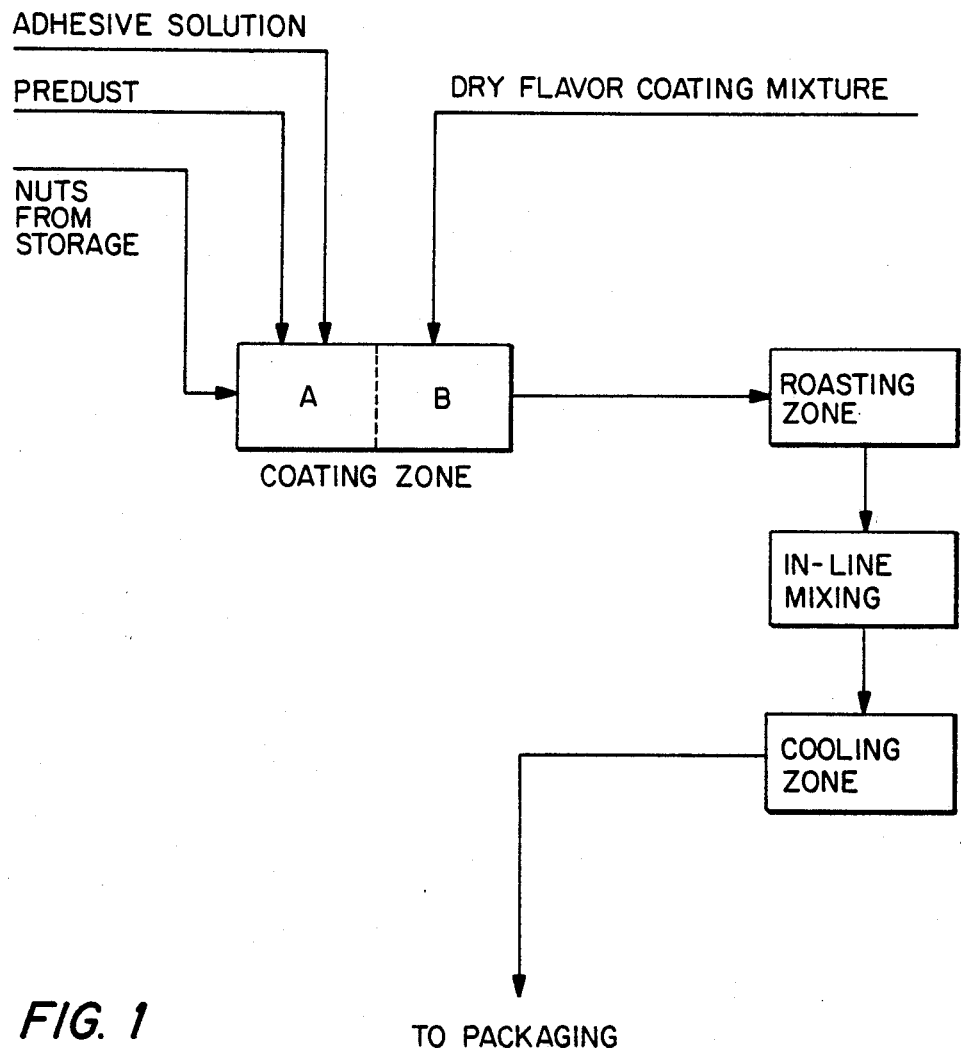
FIG. 1 is a flowsheet illustrating schematically one embodiment of the process of the invention.

The process of the invention can be applied to any of those edible nut varieties, including tree and ground nuts, which are conventionally packaged and sold as snack-type products. Illustrative of such nut meats are peanuts, cashews, almonds, walnuts, filberts, macadamia nuts, pecans, and the like. Particularly preferred products provided in accordance with the invention are those derived using peanuts and cashews as the starting materials.

The nuts are deshelled in a preliminary step and, preferably, are also subjected to other conventional procedures such as blanching and the like, prior to being subjected to the process of the invention. The term "raw nuts" is used hereinafter to refer to nuts in the form in which they are subjected to the first step of the process of the invention irrespective of what preliminary treatment, if any, has been applied to the nuts. Thus, the term raw nuts includes blanched, white-roasted nuts, as well as nuts which have been subjected to a process to remove a portion of their fat content. Typically, white-roasted nuts will have moisture contents above about 3%.

In an initial stage of the process of the invention the raw nuts are subjected to coating with a dry adhesive and an adhesive solution. This can be accomplished using any conventional coating means employed in the art. Advantageously, the coating is accomplished in a rotating coating drum. The nuts are introduced into the drum and an effective small amount of the dry adhesive is introduced while providing agitation by rotating the drum at an appropriate speed until the nuts are uniformly coated with a layer of the dry adhesive. Following the uniform predusting with the dry adhesive, the tumbling is continued during the application of the adhesive solution. Alternatively, the nuts and the adhesive solution can be introduced simultaneously in the appropriate proportions with rotation of the drum carried out as before until uniform coating is achieved. In general, the dry adhesive will be applied at a level of less than about one part by weight and the adhesive solution will be employed in a proportion in the range of about 1 part by weight to about 10 parts by weight, and preferably in the range of about 3 parts by weight to about 5 parts by weight, per 100 parts by weight of nuts.

One of the distinguishing features of the process of the invention lies in the nature and composition of the adhesive coating which includes ingredients in dry form as well as in solution to achieve an adhesive base which forms part of a highly flavorful coating. The aqueous solution comprises a mixture of honey and an adhesive film-forming material in the proportions of about 15 to about 25 percent by weight (dry basis) of honey and about 15 to about 25 percent by weight of an adhesive film-forming material. Preferably, the honey is present in a proportion of about 18 to about 20 percent by weight. The water, inclusive of any water introduced with the honey, will preferably form a major portion of the solution and will most preferably be present at a level of from about 55 to 65 weight percent. The ratio of adhesive film-forming material applied dry to that in solution will preferably be within the range of from about 1:10 to about 1:2, most preferably about 1:4. The adhesive film-forming materials applied in the dry form and in solution may be the same, if desired, or different. It is important that the dry material be able to absorb water from the solution to bring the solution rapidly to the proper degree of tackiness to pick up the desired amount of dry flavor coating mix.

Illustrative of suitable adhesive materials are those synthetic and derived vegetable gums such as xanthan, arabic, and guar, as well as dextrins, modified starches, and the like. Other optional ingredients to control viscosity and tackiness, including proteinaceous materials such as albuminoids, e.g., gelatin, albumins, glutenous materials, and like agents, can be present in the adhesive solution. The dry adhesive predust can employ any of these materials, preferably a dextrin or pregelatinized starch. The gelatin and like thickening/adhesive agents are preferably employed in lesser amounts than the gums and at levels up to about 5 percent by weight.

The manner in which the adhesive solution is prepared is not critical; however, it is important that the particular adhesive film-forming material employed be hydrated fully and held under conditions of time and temperature to assure retention of adhesive value until application of the dry flavor coating mix to the nuts.

Accordingly, it is found to be advantageous from a processing viewpoint to disperse the adhesive, film-forming material in water with heat and high-shear agitation (as required) to achieve a homogeneous mixture and complete hydration of the adhesive material prior to blending in the appropriate amount of honey.

After the raw nuts have been uniformly coated with the adhesive in the manner described above, the coated nuts are then subjected to a further coating operation in which they are enrobed with a dry flavor coating mix which comprises a particulate mixture of honey, sugar, salt, and flow control agent. This coating can be applied using conventional coating means such as the coating drum described above in regard to the first-noted coating step. Indeed, this dry coating operation can be carried out immediately after the adhesive coating operation is completed and while the nuts are still present in the coating apparatus.

In a particular embodiment, which is employed advantageously when the process of the invention is being operated on a continuous basis, the coating operations are all carried out sequentially in a continuously-operated coating drum which may be provided with means such as a helical auger for propelling the nuts along the length of the drum as it is rotated. The adhesive solution is applied to the nuts in an initial zone of such a device and, after the nuts have been uniformly coated, the dry flavor coating mix, containing honey, is introduced in a subsequent zone of the device. The residence time of the nuts in such a coating device is adjusted, advantageously by adjusting the speed of rotation of the drum or the angle it makes to the horizontal, so as to provide adequate time for each coating to be accomplished uniformly and completely.

Another distinguishing feature of the process of the invention lies in the composition of the dry flavor coating mixture which is employed in the above step. This mixture comprises honey (in particulate form), sugar, salt and flow control material as necessary; preferably, in proportions such that, in 100 parts by weight of the dry mixture, from 20 to 25 parts by weight are honey, from 60 to 70 parts by weight are sugar, and from 8 to 10 parts by weight are salt. Where necessary, a small, but effective amount of a flow control agent such as calcium stearate will also be employed to maintain the flowability of the particulate dry flavor coating mix. In a preferred mixture there are present, in 100 parts by weight of mixture, from 21 to 23 parts by weight of honey, from 66 to 68 parts by weight of sugar, from 9 to 10 parts by weight of salt and from 0.5 to 1.5 part by weight of calcium stearate. In a most preferred mixture there are about 23 parts by weight of honey, about 68 parts by weight of sugar, about 9 parts by weight of salt, and 0.9 parts calcium stearate, per 100 parts by weight of mixture.

The particle size of the dry flavor coating mixture is advantageously controlled such that the major proportion of the mix is within the range of from about 80 US mesh to about 200 US mesh and more preferably will have an average particle size in the range of from about 100 US mesh to about 150 US mesh.

Any of the solid particulate forms of honey which are available commercially can be employed in the above mixture. Illustrative of such products is that which is available under the trademark NEAT N SWEET 2000 from Henkel Corporation. Similarly, any of the commonly used forms of granulated sucrose can be employed in the above mixture, such as sucrose of a granulation which is known as fruit-granular.

The dry mixture of the above ingredients may also contain optional additions such as other flow enhancing additives, wheat starch or the like as an aid for drying honey, and other like materials for purposes and in amounts necessary to produce the effect of the particular additive.

The proportion in which the dry flavor coating mixture is applied to the adhesive coated nuts in the above step of the process of the invention is advantageously within the range of from about 4 to about 12 parts by weight per 100 parts by weight of nuts, and preferably within the range of from about 10 to about 12 parts by weight per 100 parts by weight of the nuts.

When the application of the dry flavor coating mix has been completed, the coated nuts are subjected to roasting under conditions which may vary depending upon the particular type of raw nut and the type of roasting process, be it oil or air (i.e., dry) roasting. Illustratively, the nuts are roasted at temperatures within the range of from about 280° F. to about 325° F. for a time which will vary depending upon the particular roasting temperature employed, the particular type of nut being processed, and the degree of roasting desired. For example, the time and extent of roasting will be greater in the case of peanuts than in the case of cashews. The most appropriate roasting conditions to be adopted in any particular instance can be determined readily by a process of trial and error.

The roasting operation can be conducted on a batch or continuous basis. In the case of a continuous air roasting operation the nuts are placed on a continuous foraminous belt and transported on a continuous basis through a roasting oven heated to a temperature in the above range. The residence time of the nuts in the oven is adjusted to provide the desired time of roasting. Any of the apparatus conventionally employed in the art to effect dry roasting of nuts can be utilized in the above batch or continuous roasting step. It is an advantage of the present invention that superior results are achieved when air roasting nuts coated in the manner described above.

The honey-roasted nuts which result from the above combination of steps are thereafter agitated to singularize them and then cooled, or allowed to cool, and packaged in any appropriate manner for marketing. Advantageously, the cooling of the nuts is accomplished in a relatively short period of time, of the order of about 5 minutes or less, in order to avoid continuation of the roasting process after the nuts have emerged from the roasting oven.

In the case of a continuous oil roasting operation the nuts are retained on a continuous web of wire mesh fabricated from stainless steel or the like and transported on a continuous basis through a bath of heated edible oil. The residence time of the nuts in the oil is adjusted to provide the desired time of roasting. Typically, the nuts are roasted in an edible oil such as refined peanut oil at a temperature in the range of from about 300° F. to about 330° F., preferably from about 315° F. to about 325° F., and for a time which will vary depending upon the particular type of nut being processed and upon the temperature of roasting and the degree of roasting desired. Illustratively, the time and extent of roasting will be greater in the case of peanuts (from about 4.5 to about 7 minutes) than in the case of cashews (from about 1.5 to about 3.5 minutes). The most appropriate roasting conditions to be adopted in any particular instance can be determined readily by a process of trial and error. The roasting operation can be conducted on a batch or continuous basis.

The nuts which are prepared in accordance with the process of the invention when properly executed are characterized by: improved overall appearance, including color; improved flavor, including honey, nut and overall; and improved physical characteristics, including reduced clumping or sticking, and enhanced coating adhesion.

The flowsheet shown in FIG. 1 illustrates a continuous process for honey-roasting nuts in an air roaster in accordance with the invention. In the first step of this process the raw nuts and the adhesive solution, prepared as described above, are conveyed by appropriate means from storage facilities (not shown) and are introduced continuously and in the desired proportions, as discussed above, to the COATING ZONE via an entry port in the first section (A). The COATING ZONE comprises any mechanical continuous coating means commonly employed in the coating art. Illustrative of such coating apparatus are revolving coating drums in which the nuts are caused to tumble to provide even distribution of the adhesive solution over the surface of the raw nuts. Advantageously, the coating apparatus takes the form of a cylindrical coating drum mounted with its longitudinal axis aligned at a slight angle to the horizontal with the entry port at the elevated end and adapted to rotate at a rate effective to impart a tumbling action to the nuts and to cause the nuts to be propelled towards the exit port of the device.

Alternatively, the coating apparatus employed in the COATING ZONE may comprise an open trough having a semicircular cross-section which is provided with agitating and propulsion means such as a rotating helical auger for imparting the tumbling action necessary to ensure uniform coating to the nuts and, at the same time, for causing said nuts to be conveyed at a rate along the length of the coating zone which ensures pickup of the proper amount of coating in the proper consistency.

Advantageously, the nuts enter the process raw at ambient temperature and are admixed with the dry adhesive. The combined mix of the nuts and the dry adhesive is tumbled as it is advanced through the zone, typically for less than one minute, e.g., about 5 seconds, prior to application of the adhesive solution, to achieve a uniformly complete coating of the dry adhesive on the individual nuts. The adhesive solution is preheated to a temperature in the range of about 100° F. to about 160° F., preferably from about 110° F. to about 120° F., prior to introduction into the COATING ZONE.

The adhesive solution and the nuts are blended, by continuing to tumble and advance the nuts, to achieve a uniform coating of the solution on the nuts. Tumbling is continued until the combined dry and liquid coatings provide a surface tackiness effective to pick up and hold the dry flavor coating mixture. This will typically be achieved in less than one minute of tumbling, e.g., about 30 seconds.

The stream of adhesive-coated nuts encounters a continuous stream of dry particulate flavor coating mixture of the composition described above which is introduced into the COATING ZONE at a rate which is adjusted to provide the desired proportion of dry coating mixture to nuts in the ranges discussed above. This coating step can be accomplished preferably in a later section (B) of the same coating apparatus as that employed in the continuous application of the adhesive. Alternatively, the continuous application of the dry coating mixture can be performed in a separate coating apparatus to which the stream of adhesive coated nuts is conveyed by means such as a continuous conveyor belt or the like. When such a separate coating apparatus is employed it can take the form of any of the apparatus described and exemplified in reference to the apparatus used in the other coating procedures.

The rate of continuous passage of the nuts through the second coating section (B), whether this section forms part of the same coating apparatus as section (A) or is a separate coating apparatus, is adjusted so as to permit the uniform application of a coating of the dry mixture to the nuts prior to removal of the coated nuts from the COATING ZONE. Advantageously, the rate of passage of the nuts is adjusted so that the total residence time of the nuts in the sections (A) and (B) will be less than about 5 minutes, and preferably from about 0.5 to about 2 minutes.

The coated nuts emerging on a continuous basis from the COATING ZONE are then conveyed, by continuous belt conveyor or like means, to the ROASTING ZONE wherein the coated nuts are subjected to roasting, preferably air roasting for a predetermined period of time and at a temperature in the range of about 280° F. to about 325° F. As discussed above, the precise range of temperature employed in any given instance depends upon the particular nut being treated. The apparatus employed in the ROASTING ZONE can be any of the air (dry) roasting devices known in the art which are capable of operation on a continuous basis. Such devices generally comprise an endless foraminous belt which carries a bed of nuts through a succession of heating zones, usually followed by a cooling zone. Prior to or during cooling, the nuts are agitated to ensure separation for the best results.

In general, the residence time of the coated nuts in the ROASTING ZONE varies within the range of about 15 to about 30 minutes depending upon the particular type of nut being treated, the roasting temperatures and the bed depth. Illustratively, the longer residence times within the above range are appropriate when peanuts are being subjected to temperatures as noted above at bed depths of from 2 to 10 inches, whereas shorter residence times are appropriate for cashew nuts under similar conditions.

In an optional, but desirable, final stage of the process, the continuous flow of roasted nuts emerging from the ROASTING ZONE is then discharged onto a continuous belt conveyor or like conveying means and transferred to the COOLING ZONE in which the temperature of the nuts is reduced rapidly, illustratively within a period of about 5 minutes and preferably less than about 2 minutes, to a temperature below about 100° F. This operation serves to ensure that excessive roasting of the nuts, because of maintenance of the higher temperatures at which the nuts emerge from the previous step, does not occur. It is also found that the tendency of the roasted nuts to adhere to each other, especially upon storage, is greatly reduced, if not eliminated, by agitation and passage through the COOLING ZONE. The latter ZONE advantageously comprises a closed or partially closed area through which air or inert gas, at temperatures of the order of about 80° F. or less, is caused to flow at a rate sufficient to achieve the desired reduction in temperature of the nuts. The efficiency of this cooling step is greatly enhanced by transporting the nuts through the COOLING ZONE on a conveyor belt which is perforated to permit passage therethrough of cooling air or inert gas. A particularly preferred embodiment employs a continuous wire mesh belt conveyor thereby permitting maximum contact between cooling gas and the nuts.

In a feature of the continuous process of the invention, the nuts are agitated by a horizontal mechanical mixer as they are being transferred from the ROASTING ZONE to the COOLING ZONE or within the COOLING ZONE. This operation is designed to effect separation or singularization of the individual nuts. This can be achieved as above or in any convenient manner, such as by employing an oscillating belt conveyor or by operating the belt conveyor, onto which the flow of nuts is discharged from the ROASTING ZONE, at a faster speed than the stream of nuts is moving as it exits that ZONE. The sudden acceleration in rate of movement of the nuts serves to achieve the desired separation.

The stream of honey-roasted nuts emerging from the COOLING ZONE is then collected and transported by any appropriate mean to a packaging station (not shown) where packaging of the nuts by any appropriate and conventional means is accomplished.

The following non-limiting Example illustrates a process for the continuous production of honey coated dry roasted peanuts in accordance with the embodiment shown in FIG. 1 and discussed above. Unless otherwise indicated, all parts and percentages are by weight.

Example

An adhesive liquid is prepared from the following ingredients and proportions (all parts by weight):

|  | Parts |
| --- | --- |
| Honey (83% solids) | 23 |
| Crystal Gum Tapioca Dextrin | 20 |
| Water | 57 |

A mixture of the water and crystal gum is heated with agitation to 160°–180° F. until a clear solution is obtained. The honey is then blended into the resulting solution and the adhesive solution so obtained is transferred to a holding tank where it is maintained at a temperature of 110°–120° F. until ready for use.

A continuous stream of blanched peanuts (Jumbo Runners) is introduced at a rate of 150 lbs per minute into the entry port of a cylindrical coating drum rotating at a speed of 10 rpm. At the upper end of the drum, just after introduction of the nuts, dry adhesive (the Crystal Gum tapioca dextrin) is introduced onto the tumbling nuts at a rate of about 0.34 pounds per minute to precoat the nuts with a uniform dusting of the dry adhesive. At a location in the coating drum corresponding to an initial 5 seconds residence time for the nuts, there is introduced a continuous stream of the adhesive liquid (prepared as described above) at a rate of 6 lbs per minute. At a location in the coating drum corresponding to 30 seconds residence time following the introduction of the syrup, there is introduced, at a rate of 16.7 lbs/minute, a dry flavor coating mixture prepared by intimate blending of the following ingredients (all parts by weight):

|  | Parts |
| --- | --- |
| Neat N Sweet ® 2000 Particulate Honey | 22.5 |
| Fruit Granulated Sugar | 67.6 |
| Salt (flour) | 9.0 |
| Calcium Stearate | 0.9 |

The above dry flavor coating mixture has the following screen analysis:

| % | USS Mesh No. |
| --- | --- |
| 100 through | 25 |
| 2 on | 40 |
| 24 on | 80 |
| 10 on | 100 |
| 19 on | 200 |
| 12 through | 200 |

A stream of coated nuts is discharged from the exit port of the coating drum onto an oscillating conveyor after a total average residence time in the coating drum of 1 minute. The oscillating conveyor builds a four-inch deep bed of the coated nuts on a perforated endless conveyor which advances to a Procter and Shwartz four-zone gas-fired roaster. The roasting temperature is maintained at 265° F. in the first two zones and 285°-290° F. in the two final heating zones. The average residence time in the roaster is about 30 minutes. Following the last of the heating zones, the nuts are agitated by an in-line horizontal mechanical mixer, enabling the nuts to be easily separating following cooling. While the nuts are undergoing agitation, they are subjected to cooling by a stream of air at ambient temperature (ca 70° F.). The average residence time of the nuts in this zone is about 2 minutes and the temperature of the nuts emerging from the zone is about 100±10° F. As the nuts emerge from the cooling zone, they are free-flowing and separate.

The resulting honey-roasted nuts are then transferred to a packaging station and sealed in predetermined quantities in containers for distribution to wholesale and retail outlets. Samples of the nuts were subjected to examination by a panel of tasting experts and rated as exhibiting excellent flavor, aroma and texture as well as attractive eye appeal. The salt content is found to be 0.9 percent by weight and the moisture content is 1.5 percent by weight. Employing an Agtron color photometer in the green mode using the 0 and 33% plates to define the scale, a reflectance value of 44 was found for the whole nuts and a reflectance value of 70 was found for a sample of the nuts after coarse grinding.

It is to be understood that the above Example is given by way of illustration only and is not to be construed as limiting.

What is claimed is:

1. A honey-roasted nut comprising a nut having successive coatings which comprise, from the nut outward based on 100 parts by weight of nuts:
  (a) no greater than about 1 part by weight of a dry adhesive;
  (b) the dried residue of about 1 to about 10 parts by weight of an adhesive solution comprising about 15 to about 25 percent by weight on a dry basis of honey, about 15 to about 25 percent by weight of an adhesive film-forming material, and at least about 50 percent by weight of water; and
  (c) about 4 to about 12 parts by weight of a dry flavor coating mixture comprising about 20 to about 25 percent by weight of honey, about 60 to about 70 percent by weight of sugar, and about 8 to about 10 percent by weight of salt, wherein the ratio of said dry adhesive to said adhesive film-forming material is about 1:10 to about 1:2.

* * * * *